United States Patent
Dyer et al.

(10) Patent No.: US 8,793,971 B2
(45) Date of Patent: Aug. 5, 2014

(54) FUEL PUMPING SYSTEM FOR A GAS TURBINE ENGINE

(75) Inventors: Gerald P. Dyer, Enfield, CT (US); Kevin Gibbons, Torrington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1107 days.

(21) Appl. No.: 12/786,844

(22) Filed: May 25, 2010

(65) Prior Publication Data

US 2011/0289925 A1 Dec. 1, 2011

(51) Int. Cl.
- *F02C 7/236* (2006.01)
- *F02C 7/232* (2006.01)
- *F02C 7/22* (2006.01)

(52) U.S. Cl.
CPC .............. *F02C 7/232* (2013.01); *F02C 7/236* (2013.01); *F02C 7/22* (2013.01)
USPC .............. 60/39.281; 60/734; 137/625.34; 137/118.06; 137/114

(58) Field of Classification Search
CPC ............ F02C 7/236; F02C 7/22; F02C 7/232; F02C 9/26; F02C 9/32
USPC .......... 60/734, 39.281; 137/102, 114, 118.06, 137/625.34
See application file for complete search history.

(56) References Cited

U.S. PATENT DOCUMENTS

| | | | |
|---|---|---|---|
| 4,607,486 A | 8/1986 | Cole | |
| 4,745,747 A | 5/1988 | Krausse et al. | |
| 5,110,269 A | 5/1992 | Fallon | |
| 5,116,362 A * | 5/1992 | Arline et al. | 60/734 |
| 5,159,808 A | 11/1992 | Kast | |
| 5,168,704 A | 12/1992 | Kast et al. | |
| 5,245,819 A | 9/1993 | Kast | |
| 6,651,441 B2 * | 11/2003 | Reuter et al. | 60/772 |
| 6,666,015 B2 | 12/2003 | Dyer | |
| 7,094,042 B1 | 8/2006 | Borgetti et al. | |
| 7,165,949 B2 | 1/2007 | Firnhaber | |
| 7,234,293 B2 * | 6/2007 | Yates et al. | 60/39.281 |
| 7,637,724 B2 | 12/2009 | Cygnor | |
| 8,366,404 B2 * | 2/2013 | Griffiths et al. | 417/213 |
| 2008/0289338 A1 * | 11/2008 | Desai | 60/734 |
| 2010/0263634 A1 * | 10/2010 | Futa et al. | 123/511 |

FOREIGN PATENT DOCUMENTS

| | | |
|---|---|---|
| EP | 1557546 B1 | 11/2006 |
| EP | 1715161 B1 | 5/2011 |
| WO | 03023208 A1 | 3/2003 |
| WO | 2007044020 A2 | 4/2007 |
| WO | 2011042641 A1 | 4/2011 |

OTHER PUBLICATIONS

European Search Report for corresponding European Application No. 11167781.1 completed on Mar. 13, 2013.

* cited by examiner

*Primary Examiner* — William H Rodriguez
*Assistant Examiner* — Carlos A Rivera
(74) *Attorney, Agent, or Firm* — Carlson, Gaskey & Olds, PC

(57) ABSTRACT

A fuel supply system for a gas turbine engine has a first pump for delivering fuel to a first use on a gas turbine engine, and a second pump for delivering fuel to a second use on the gas turbine engine. A valve allows flow from the first pump to be delivered to the first use, but also routes some flow from the first pump to supplement fuel flow from the second pump until a pressure downstream of the second pump increases. The valve then allows flow from the second pump to flow to the first use to supplement the flow from the first pump.

4 Claims, 2 Drawing Sheets

FUEL PUMPING SYSTEM FOR A GAS TURBINE ENGINE

BACKGROUND

This application relates to an improved fuel pumping system wherein a servo gear and a main gear act in cooperation in distinct manners dependent on varying system conditions.

Gas turbine engines are known, and typically include a compressor compressing air and delivering it in a combustion chamber. The compressed air is mixed with fuel in the combustion chamber, combusted, and the products of combustion pass downstream over turbine rotors, driving the rotors to create power.

There are many distinct features involved in a gas turbine engine. As one example only, the compressor may be provided with variable vanes which are actuated to change an angle of incident dependent on system conditions. Actuators for changing the angle of incident of the vanes are provided with hydraulic fluid from a servo gear pump.

Further, a main gear pump is utilized to deliver fuel into the combustion chamber. It is known in gas turbine engines that fuel can be used as the hydraulic fluid in the accessory actuators as mentioned above.

In a known system, the operation of the servo gear pump requires especially high flow at early operation conditions. However, under more steady state operation, the servo gear pump does not necessarily need to move as much fluid to the accessory actuators.

On the other hand, the main gear pump for supplying fuel to the combustion chamber does not necessarily need as much flow at the start of operation. It does increase its flow needs as the engine continues to operate.

Thus, it is known to provide a "minimum pressure valve" on a line downstream of the servo gear pump. After the servo gear pump has built up its pressure, the valve opens and then fuel from the servo gear pump can supplement the fuel from the main gear pump being delivered into the combustion chamber.

As the number, and complexity of the accessories associated with a gas turbine engine increases, the size of the servo gear pump necessary to supply adequate fuel to each of the actuators is also increasing.

SUMMARY

A fuel supply system for a gas turbine engine has a first pump for delivering fuel to a first use on a gas turbine engine, and a second pump for delivering fuel to a second use on the gas turbine engine. A valve allows flow from the first pump to be delivered to the first use, but also routes some flow from the first pump to supplement fuel flow from the second pump until a pressure downstream of the second pump increases. The valve then allows flow from the second pump to flow to the first use to supplement the flow from the first pump.

These and other features of the present invention can be best understood from the following specification and drawings, the following of which is a brief description.

DETAILED DESCRIPTION

Figure 1:
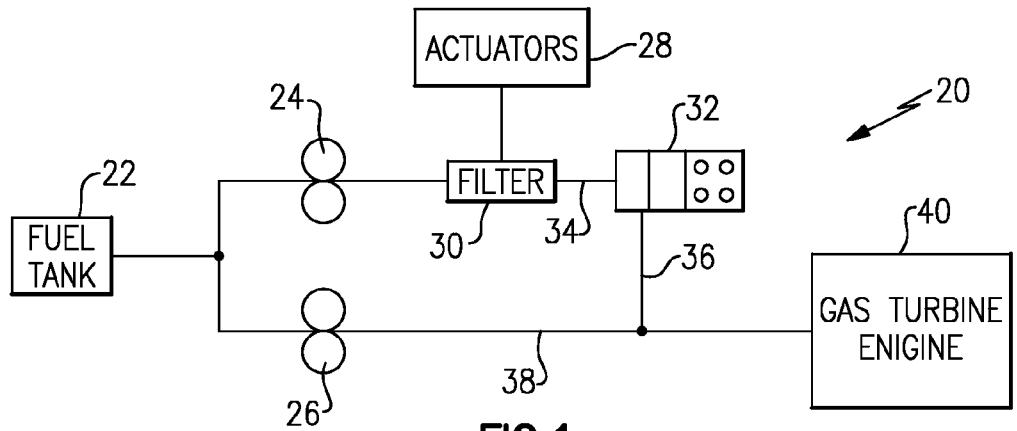
FIG. 1 shows a prior art fuel pumping system for a gas turbine engine.

FIG. 1 shows a prior art fuel pumping system 20 for use on an aircraft, and for supplying fuel to a gas turbine engine 40. As shown, a fuel tank 22 delivers fuel to each of a main gear pump 26, and a servo gear pump 24. While gear pumps are disclosed, the invention can extend to other types of pumps. Downstream of the main gear pump 26 is a line 38 leading to the gas turbine engine 40, and in particular its combustion chamber.

The servo gear pump 24 delivers fuel into a filter 30, and then can communicate to accessory actuators 28. The accessory actuators 28 can be any number of components, and as one example only, may be a variable vane actuator for use in a compressor section in the gas turbine engine 40.

Another line 34 leads from the filter 30, and to a minimum pressure valve 32. The minimum pressure valve 32 either blocks flow from line 34 to line 36, or allows that flow.

At early system conditions, the pressure developed on line 34 will be relatively low, as a good deal of fluid flow is required at the accessory actuators 28. Thus, a spring incorporated into the minimum pressure valve 32 blocks flow from line 34 to line 36. At that point, the fuel delivered to line 38 from the main fuel pump 26 is the only fuel being delivered to the gas turbine engine 40.

However, once the servo gear pump 24 has adequately supplied its fuel to the accessory actuators 28, then the pressure builds up on line 34, the valve 32 opens, and flow from line 34 can supplement the flow from line 38 through line 36. Thus, at more steady state conditions, the fuel being delivered to the gas turbine engine 40 is at least partially from the servo gear pump 24, and also from the main gear pump 26.

Figure 2:
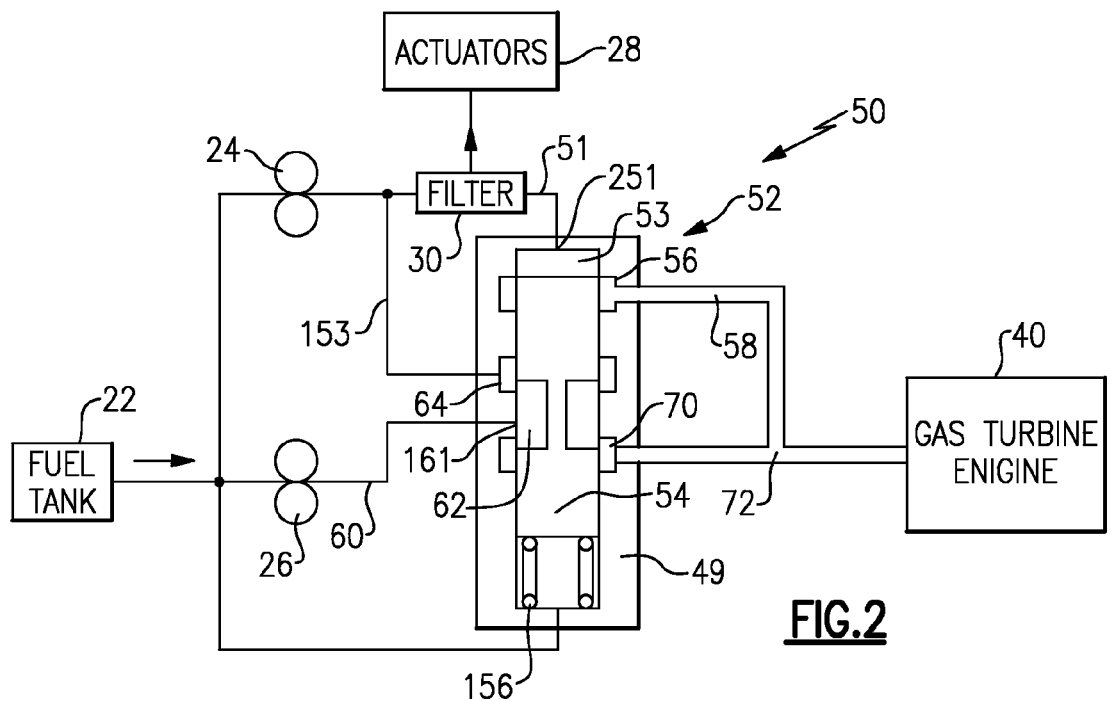
FIG. 2 shows a fuel supply system in a first condition.

FIG. 2 shows a fuel supply system 50. In fuel supply system 50, a valve 52 is incorporated. A line 51 downstream of the filter 30 communicates with a chamber 53 through a port 251, wherein a pressure acts in opposition to a spring force 156 (also referred to generally as a bias force) on a valve spool 54. As shown, valve spool 54 is provided with an intermediate groove 62.

A line 58 downstream of a housing groove or port 56 in a valve housing 49 of valve 52 supplements a main fuel flow line 72 downstream of the main gear pump 26.

The FIG. 2 position illustrates an early condition wherein fuel must be provided in greater volume to the accessory actuators 28. Notably, it should be understood that the fuel provided to the accessory actuators 28 is utilized generally as a hydraulic fluid, and is not combusted. On the other hand, the fuel delivered to the gas turbine engine 40 is largely combusted at the combustion section.

In the position illustrated in FIG. 2, the valve spool 54 blocks flow from the chamber 53 through the port 56 and into line 58. Thus, in this condition, fuel delivered to the gas turbine engine 40 flows only from a port 161 at the end of the line 60, into the intermediate groove 62, into housing groove or port 70 and then into line 72.

However, the intermediate groove 62 is also positioned to communicate fuel from the line 60 into the housing groove or port 64. That fuel passes into line 153, and supplements the flow downstream of the servo gear pump 24 being delivered to the accessory actuators 28. Thus, at early system conditions, the accessory actuators 28 receive fuel not only from the servo gear pump 24, but also from the main gear pump 26.

Fluid is also still moved by the main gear pump 26 to line 72, and is adequate for providing fuel for combustion at these early conditions.

Figure 3:
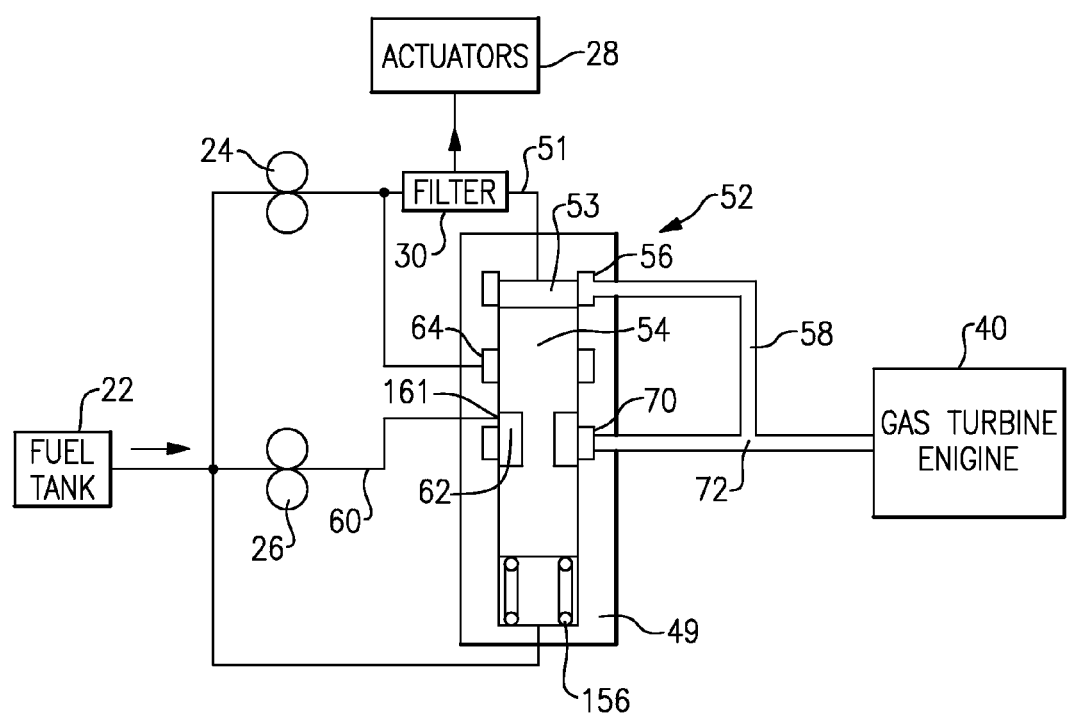
FIG. 3 shows the fuel supply system in a steady state condition.

Eventually, the accessory actuators 28 are moved to desired positions, and the amount required to be delivered to the accessory actuators 28 is reduced. At that point, the pressure on line 51 and delivered into chamber 53 increases. The valve spool 54 then moves to a position such as shown in FIG. 3. In the FIG. 3 position, the intermediate spool groove 62 communicates line 60 entirely into the port 70, and the line 72. The flow from the intermediate spool groove 62 no longer communicates with port 64, and thus the main gear pump 26 no longer supplements the servo gear pump 24.

In the FIG. 3 position, the chamber 53 communicates with the port 56. Thus, fuel being moved by the servo gear pump 24 now supplements the main gear pump 26 by passing from housing groove 56, into line 58, and then combining with the fuel flow on line 72 being delivered to the gas turbine engine 40.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel supply system for a gas turbine engine comprising:
   a first pump for delivering fuel to a first line extending to a first use on a gas turbine engine;
   a second pump for delivering fuel to a second line extending to a second use on the gas turbine engine;
   a valve allowing flow from said first pump to be delivered to the first line, but also routing some fuel flow from said first pump to supplement fuel flow from said second pump until a pressure downstream of said second pump increases, and said valve then allowing fuel flow from said second pump to flow to the first line to supplement the fuel flow from said first pump;
   said first pump supplementing fuel flow from said second pump to said second line;
   wherein said first use will be a combustion chamber for the gas turbine engine, and said second use will be as a hydraulic fuel for at least one accessory actuator;
   said valve includes a valve housing, said valve housing being provided with a first port to communicate said first pump to said first line, and to said second line, and said valve housing being provided with a second port to communicate said second pump to the first line; and
   said valve includes a bias force which biases a valve spool in opposition to the pressure downstream of said second pump, said valve spool being positioned to allow fuel flow from said first pump to supplement fuel flow from said second pump to the second line, and also allow fuel flow from said first pump to be delivered to the first line, and block fuel flow from said second pump from passing to the first line until the pressure downstream of said second pump increases enough to overcome the bias force on said valve spool.

2. The fuel supply system as set forth in claim 1, wherein said bias force is a mechanical spring force.

3. A gas turbine engine comprising:
   at least one actuator for an accessory associated with a gas turbine engine; and
   a combustion chamber;
   a first pump for delivering fuel to a first line extending to the combustion chamber;
   a second pump for delivering fuel to a second line extending to the at least one actuator;
   a valve allowing fuel flow from said first pump to be delivered to said first line, but also routing some fuel flow from said first pump to supplement fuel flow from said second pump to said second line until a pressure downstream of said second pump increases, and said valve then allowing fuel flow from said second pump to flow to said first line to supplement fuel flow from said first pump;
   said valve includes a valve housing, said valve housing being provided with a first port to communicate said first pump to said first line, and to said second line, and said valve housing being provided with a second port to communicate said second pump to said first line; and
   said valve includes a bias force which biases a valve spool in opposition to the pressure downstream of said second pump, said valve spool being positioned to allow fuel flow from said first pump to supplement fuel flow from said second pump to said second line, and also allow fuel flow from said first pump to be delivered to said first line, and block fuel flow from said second pump form passing to said first line until the pressure downstream of said second pump increases enough to overcome the bias force on said valve spool.

4. The gas turbine engine as set forth in claim 3, wherein said bias force is a mechanical spring force.

* * * * *